May 11, 1948.  R. E. KRUEGER  2,441,363
COUPLING
Filed May 19, 1945  2 Sheets-Sheet 1

RUDOLPH E. KRUEGER,
INVENTOR.

BY
ATTORNEY

May 11, 1948. R. E. KRUEGER 2,441,363
COUPLING
Filed May 19, 1945 2 Sheets-Sheet 2

RUDOLPH E. KRUEGER,
INVENTOR.

BY
ATTORNEY

Patented May 11, 1948

2,441,363

UNITED STATES PATENT OFFICE 2,441,363

COUPLING

Rudolph E. Krueger, Downey, Calif., assignor to Accessories Manufacturing and Engineering Company, Pasadena, Calif., a corporation of California Application May 19, 1945, Serial No. 594,687

4 Claims. (Cl. 285—174)

My invention relates to couplings and has particular reference to self-locking quick-release couplings to be employed in hydraulic, pneumatic or electric systems.

In hydraulic or pneumatic systems, it is frequently necessary to employ a detachable coupling for permitting the ready interconnection and disconnection of portions of the hydraulic system and it is extremely desirable that such couplings when coupled together will not become inadvertently disconnected when the couplings or the system are subjected to vibration. In high pressure fluid lines it is necessary to insure that the coupling members, once connected together, will be latched or otherwise held together to resist disconnection under the influence of the pressures within the line while in many instances it is essential also that the coupling be readily disconnectable with a minimum of effort and attention.

For example, in many airplane installations it is desirable that high pressure fluid lines be quickly coupled together and latched or locked in a coupled condition, but subject to automatic disconnection when a pull is exerted upon the lines interconnected by the coupling.

The same problems are involved in electrical installations wherein it is desired to rapidly couple two portions of an electrical conductor or cable together with assurance that they will not become disconnected when subjected to vibration while at the same time it is desired that they be subject to rapid disconnection merely by a pull exerted between the two portions of the cable.

It is therefore an object of my invention to provide a coupling of the character described in which the coupling of the two portions of a fluid line or two portions of an electric conductor or cable may be readily connected together merely by axially pressing the two coupling members toward each other and in which latching means automatically operated as a result of such axial movement of the coupling members will securely hold the coupling members in their connected positions until purposely disconnected.

Another object of my invention is to provide a coupling member of the character described wherein the latching means securely holds the coupling members in their connected relation against internal forces exerted between the two coupling members but in which the latching means is readily releasable when it is desired to disconnect the coupling members.

Another object of my invention is to provide a coupling of the character described in the preceding paragraph wherein the latching means is readily released upon the exertion of an axial pull on one of the cable or fluid line portions connected by the coupling.

Another object of my invention is to provide a coupling of the character set forth in which the latching means is positively held in latching relation until a manual release of the latching means is performed whereupon the coupling members may be disconnected by an axial pull exerted between them.

Other objects and advantages of my invention will be apparent from a study of the following specifications, read in connection with the accompanying drawings, wherein Fig. 1 is a longitudinal sectional view taken through a coupling constructed in accordance with my invention and illustrating the position of the parts just prior to the coupling up of the two coupling members;

Figure 1:
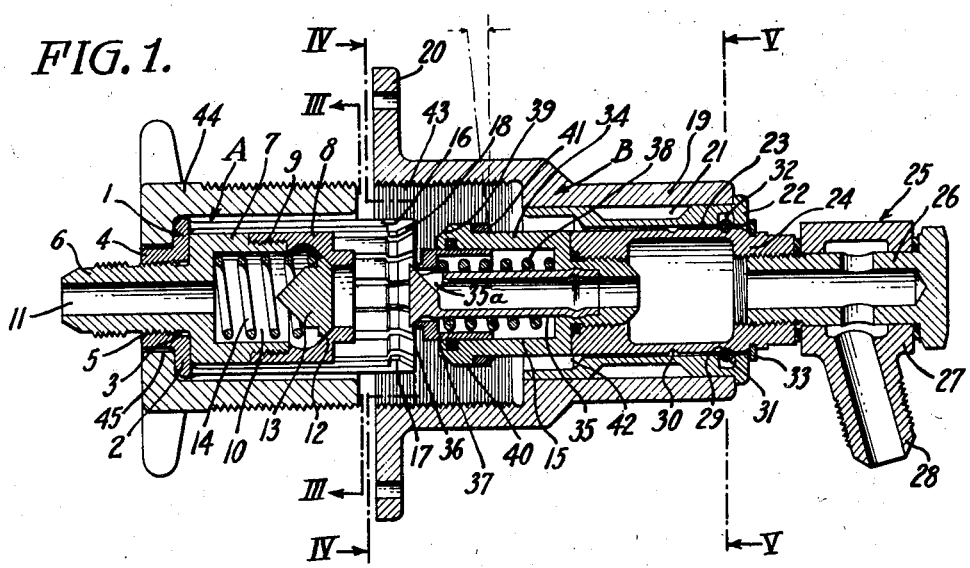

Referring to the drawings, I have illustrated in Fig. 1 a coupling comprising a female coupling member designated generally by the reference character A and a male coupling member designated generally by the reference character B, these coupling members in effect constituting housings within which may be placed either electrical plug and socket connectors or fluid couplings of any desired character. For the purposes of illustration herein, I show the coupling members A and B as adapted to interconnect two parts of a fluid line or system though it will be understood by those skilled in this art that the principles described in the following description are equally applicable to electrical installations.

The coupling member A comprises a housing member 1 preferably cylindrical in shape and having an end wall 2 through which extends an axial bore 3, the end wall having a longitudinally extending flange 4 formed thereon and projecting outwardly of the housing 1, the flange 4 being internally threaded as indicated at 5 to threadedly receive a connecting boss 6 formed upon the hydraulic or electrical connecting member with which the housing 1 is to be associated which in the form of apparatus illustrated in Fig. 1 is illustrated as a hydraulic self-closing coupling comprising a pair of hollow body members 7 and 8 connected together as indicated at 9 defining between them a fluid flow chamber 10 communicating with a fluid passage 11 extending axially through the connecting boss 6. The outer end of the housing member 8 has formed therein a tapered internal seat 12 against which a closure 13 seats under the influence of a helical spring 14 to close the connecting member against flow of fluid when the connecting member is disconnected from its complementary connecting member 15.

The side walls of the cylindrical housing member 1 are split to define a plurality of segmental latch fingers 16 as by a plurality of longitudinal slots along the housing 1, the fingers being formed with radially inwardly projecting portions 17 spaced inwardly of the outer end of the housing 1 while the extreme outer end of the housing is formed with an outward taper or flare as indicated at 18. The inwardly projecting portions are formed with inclined shoulders 17'. The angle of inclination of these shoulders is approximately seven degrees with relation to a transverse plane normal to the axis of the cylindrical member. This inclination is made so that the fingers will disengage a shoulder to be hereinafter described upon the exertion of sufficient longitudinal pull to cause the fingers to ride up over the shoulders.

The male coupling member B is constructed as a housing member 19 which may be provided with a radially extending flange 20 at its outer end for mounting the housing 19 upon any stationary support such as a wall though it will be understood that the coupling member B may be secured to a flexible pipe or hose without requiring its stationary mounting. The housing 19 is provided with a longitudinal passage 21 extending therethrough from end to end, into which is received a sleeve 22 press fitted into the bore 21. The sleeve 22 is preferably formed of steel or similar material capable of resisting wear while the housing 19 may be formed of other metal, such as aluminum alloy, for the purpose of saving weight in the completed installation though it will be understood that for certain types of installations the sleeve 22 and housing 19 may be formed as a single element.

The sleeve 22 has an internal bore 23 into which is slidably mounted a bushing 24 into the outer end of which is threaded the connecting member 15 while the inner end of the bushing 24 provides a means for threaded connection with a pipe or tube fitting 25 into the fluid line with which the coupling is to be used. The particular form of fitting 25 illustrated is a swivel coupling including a central stem portion 26 about which is rotatably mounted a swivel member 27, at one side of which is a coupling boss 28 adapted to be secured to tube fittings in the hydraulic or pneumatic line.

The coupling member 15 is permitted a limited axial sliding movement within the housing B and sleeve 22 as by forming a pair of annular grooves 29 and 30 about the bushing 24 spaced from each other along the length of the bushing by the distance through which it is desired the bushing and coupling 15 are to be moved, the grooves receiving a snap ring 31 disposed in an annular groove 32 formed in the sleeve 22. Thus the connecting member 15 and bushing 24 may be pulled or moved to a left-hand position, as shown in Fig. 1, disposing the snap ring 31 in the groove 29, the amount of movement to the left being limited by a collar 33 formed upon or secured upon the bushing 24. The bushing 24 and its connecting member 15 may be moved to the right until the snap ring 31 is disposed in the groove 30 and the connecting member 15 will be yieldably held in either of its extreme right-hand or left-hand positions.

In the type of connecting member 15 illustrated in Fig. 1, the connecting member is a self-closing or self-sealing connector formed as a hollow body 34 within which is coaxially mounted a valve seat member 35 having a tapered valve seat 36 formed upon its outer end, against which seats a valve sleeve 37 urged into seating relation by means of a helical spring 38 disposed within the body 34.

Figure 2:
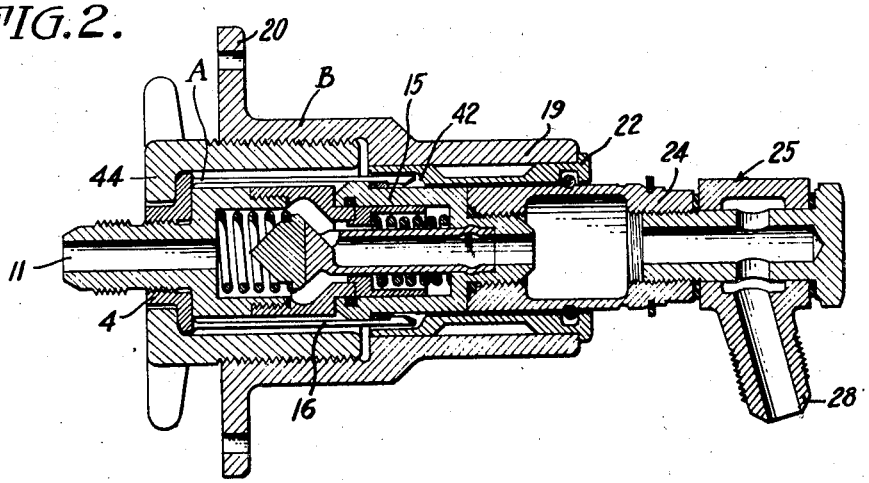
Fig. 2 is a view similar to Fig. 1 but illustrating the position of the parts after the coupling operation has been performed.
Figure 3:
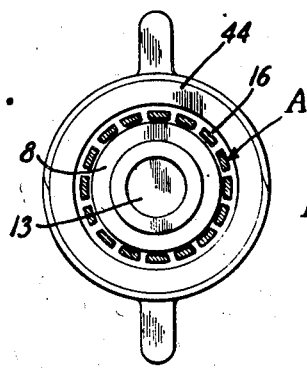
Fig. 3 is a transverse sectional view taken along line III—III of Fig. 1.

By referring particularly to Figs. 1 and 2, it will be observed that the extreme outer end of the housing 34 is formed with a beveled or tapered surface 39 adapted to engage the tapered surface 18 of the fingers 16 of the housing A and the diameter of the end portion 40 of the body 34 is greater than the diameter defined by the inward projections 17 on the fingers 16 so that when the coupling members are axially moved toward each other the spring fingers will be expanded to ride over a shoulder defining portion 40 of the body 34 until they pass a latch shoulder 41, whereupon the shoulders 17' of spring fingers 16 contract behind the shoulder and hold the two coupling members together against inadvertent disconnection. The latch shoulder 41 is inclined to agree with the inclination of the shoulders 17' so that a predetermined longitudinal strain between the male and female coupling members will cause the shoulders 17' to ride up over shoulders 41 and to become disengaged therefrom.

The length of the spring fingers 16 and the length of the enlarged diameter portion 40 is such that the spring fingers will engage behind the shoulder 41 only after the connecting members 7 and 15 have been pressed together sufficiently to make a fluid-tight hydraulic connection between them, the particular connectors illustrated including the sleeve valve 37 which will be engaged by the extreme outer end of the body 8 and be pressed inwardly thereby to open a fluid passage through ports 35a, while at the same time the outer end of the valve seat member 34 will project into the body 8 to engage the closure 13 and press it rearwardly to the position shown in Fig. 2. Thus when the coupling members A and B are connected together, a fluid passage is provided through the connecting members 7 and 15.

When the coupling members have been pressed toward each other sufficient to engage the spring fingers 16 behind the shoulder 41, a further axial thrust exerted upon the coupling member A will cause it to move the bushing 24 and connecting member 15 bodily rearwardly into the housing 19, disposing the spring fingers 16 within a counterbore 42 at the inner end of the sleeve bore 23. The surrounding wall of the counterbore 42 of the sleeve 22 defines an annular latch sleeve which will be disposed in an embracing position around the free ends of the fingers 16. Thus internal forces exerted between the coupling members as by pressure forces in the line with which the coupling is associated, will not be able to disconnect the coupling members. The latch fingers are thus temporarily held against a radial releasing movement.

However, when it is desired to disconnect the coupling member a direct axial pull exerted between the coupling members A and B to separate them will first cause the assembled coupling member A and connector 15 to slide to the left to expose the spring fingers 16 beyond the outer end of the sleeve 22, whereupon a continued pull in the same direction will snap the spring fingers back over the shoulder 41 to permit the separation of the connecting members 7 and 15 from each other.

With the arrangement illustrated, it will be apparent that once the coupling members have been connected together, vibration or other shocks which will not exert a positive longitudinal pull between the coupling members will not disturb the secure intercoupling of the two members and yet the coupling may be coupled up or disconnected merely by a direct axial thrust or a direct axial pull exerted between the members. These operations are not accompanied by preliminary counter moves or relative rotation of the parts.

In some hydraulic installations the pressures encountered may be extremely high and it may be desirable to use a tool for exerting the necessary axial thrusts to couple up the coupling members A and B. This may be readily accomplished by forming an enlarged bore 43 in the outer end of the housing B which may be threaded to receive a threaded tool 44 having a radially inwardly projecting flange 45 adapted to engage the end wall 2 of the coupling member A and exert a positive thrust of the coupling member A into connection with the coupling member B. After the coupling members have been connected together as hereinbefore described, the tool 44 will be removed so as to permit the rapid and ready disconnection of the coupling by the exertion of an axial pull between them.

With the construction thus far described, it will be apparent that the coupling is readily adapted for interconnecting various types of pneumatic or hydraulic fluid lines or male and female electrical connectors may be employed in place of the connectors 7 and 15 where it is desired to use a coupling having the herein described characteristics in an electrical installation.

Figure 6:
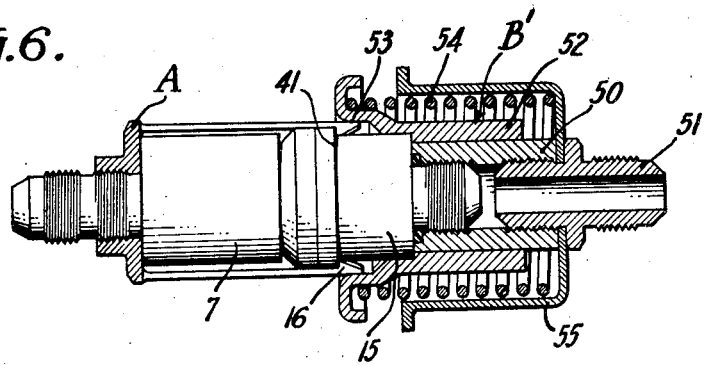
Fig. 6 is a longitudinal sectional view through a modified form of coupling embodying the principles of my invention.
Figure 4:
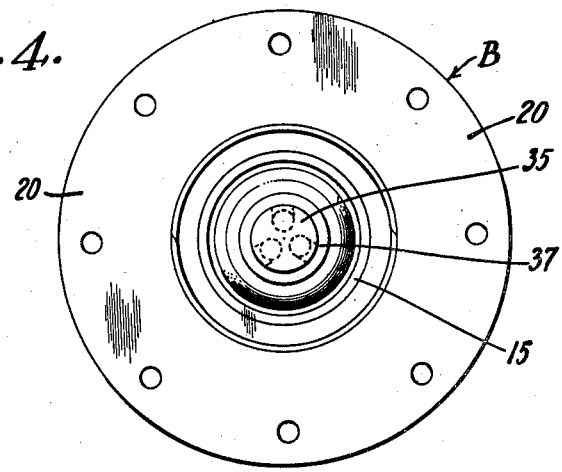
Fig. 4 is a transverse sectional view taken along line IV—IV of Fig. 1.
Figure 5:
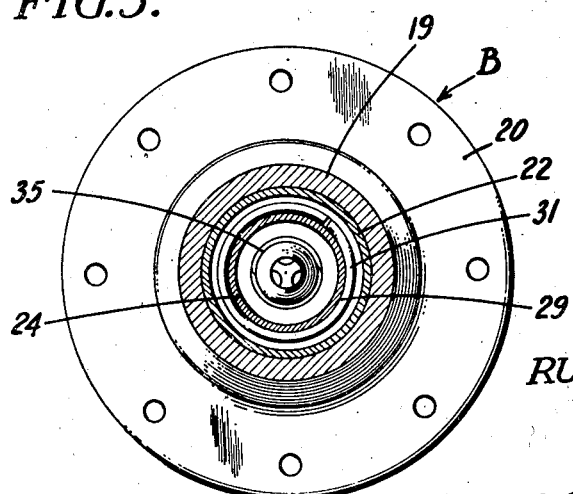
Fig. 5 is a transverse sectional view taken along line V—V of Fig. 1.

In Fig. 6 I have illustrated a modified form of coupling which may be employed in installations where it is desired to prevent a disconnection of the coupling members when an axial pull is exerted between them but in which it is desired to require a positive manual operation of some character before a disconnection can be accomplished. In this form of coupling I utilize a coupling member A identical with that illustrated and described with reference to Figs. 1 through 5 but I employ a coupling member B' in which the connecting member 15 is secured to a cylindrical bushing 50 adapted to be connected by means of a suitable fitting 51 to one end of a hydraulic or pneumatic line. Upon the external cylindrical surface of the bushing 50 there is slidably mounted a locking sleeve 52, the outer end of which is formed with an internal diameter indicated at 53 adapted to receive the ends of the spring fingers 16 only after they have passed over the shoulder 41 on the connector 15. The locking sleeve 52 is normally urged toward its outer or finger-engaging position by means of a helical spring 54, the inner end of which may bear against a cup-like housing member 55 and which may be employed as a mounting means for mounting the coupling member B' to a stationary support if desired.

It will be apparent from a study of Fig. 6 that when it is desired to couple up the coupling members A and B' an axial thrust exerted between the two members will cause the spring fingers to ride up over the large diameter portion of the connector 15 until the spring fingers 16 engage the outer end of the sleeve 52 whereupon continued thrust will cause the sleeve 52 to be retracted against the force of its spring 54 until the spring fingers snap over the shoulder 41. The sleeve 52 will then be moved outwardly under the influence of its spring 54 to surround the spring fingers with a lock, preventing inadvertent disconnection of the coupling members.

When it is desired to disconnect the members, a manual thrust exerted on the sleeve 52 will move it to its retracted position, releasing the spring fingers 16 and permitting the disconnection of the coupling members by the exertion of an axial pull between the coupling members A and B'.

While I have shown and described the preferred embodiment of my invention, I do not desire to be limited to any of the details of construction shown and described herein, except as defined in the appended claims.

I claim:

1. A coupling comprising separable male and female members, latch means carried by one of said members, a latch shoulder carried by the other of said members and engageable by the latch means when said coupling members are assembled in longitudinal alignment, an annular latch member associated with the last named coupling member and acting to circumscribe the latch means when in engagement with said latch shoulder, and means yieldably holding said annular latch means against longitudinal movement relative to the associated coupling means and acting upon a direct longitudinal pull to permit separation of the coupling members whereby the annular latch member will be retracted from its latching position and the latch means will be permitted to move to a position of disengagement relative to the latch shoulder.

2. A coupling comprising a movable female coupling element and a relatively stationary male coupling element adapted to be temporarily connected together by relative longitudinal movement, yieldable spring latch means carried by the female coupling element, a latch shoulder carried by the male coupling element and adapted to be engaged by the yieldable spring latch means to hold said coupling elements in locked position, guard means embracing the free ends of said yieldable spring means when in said locked position, and a mounting therefor whereby upon direct longitudinal movement to separate said coupling members the guard means will move initially incident to said movement to a non-obstructing position and thereafter the yieldable spring means will release the latch shoulder.

3. A coupling comprising male and female elements, the female element including a body member forming a continuation of a conduit and being open at its inner end, a plurality of radially movable latch fingers arranged circumferentially around said body member adjacent to its inner end, a tubular body member formed as a part of said male coupling element and adapted to be moved longitudinally to an abutting position against the open end of the tubular body member of the female coupling element, a latch shoulder on the tubular body member of the male coupling element adapted to be engaged by the latch fingers carried by the female coupling element, a latch sleeve mounted slidably upon the tubular body member of the male coupling element and adapted to assume an embracing position around the free ends of the latch fingers when said fingers are in latching position, and yieldable cooperating means between said latch sleeve and the tubular body member of the male coupling element acting to hold said latch sleeve and tubular body member in fixed relation to each other and whereby a direct pull to separate the male and female coupling elements will cause the latch sleeve to first move to a releasing position, after which continued pull will release the latch fingers from engagement with the latch shoulder.

4. A coupling comprising separable male and female elements, the male element including a relatively stationary latch sleeve, a tubular body member extending through said latch sleeve and longitudinally reciprocating therein, an enlarged portion at the outer end of said tubular body member forming an annular latch shoulder presented toward the outer end of the latch sleeve, the female coupling comprising a tubular body portion, a plurality of latch fingers arranged circumferentially around said body portion and connecting therewith to yield radially, shoulders upon said latch fingers adapted to move over the enlarged end of the tubular body member on the male coupling member to engage the same and temporarily hold said male and female coupling members in locked relation to each other, and yieldable means cooperating between the latch sleeve and the tubular body member of the male coupling member to hold the outer end in an embracing position around the free ends of the latch fingers when the shoulders on said fingers and the shoulder on the tubular body member of the male coupling member are engaged, whereby the longitudinal pull on the female coupling member will move the tubular body member of the male coupling member to withdraw the enlarged end of the tubular body member of the male coupling member from within the latch sleeve, and whereby further longitudinal pull on the female coupling member will cause the latch fingers to become disengaged from the tubular body member of the male coupling member.

RUDOLPH E. KRUEGER.

REFERENCES CITED

The following references are of record in the file of this patent:

UNITED STATES PATENTS

| Number | Name | Date |
|---|---|---|
| 1,315,484 | Fesler | Sept. 9, 1919 |
| 1,904,061 | Larson | Apr. 18, 1933 |
| 2,311,239 | Main et al. | Feb. 16, 1943 |